United States Patent
Reed et al.

(10) Patent No.: US 9,470,317 B1
(45) Date of Patent: Oct. 18, 2016

(54) VENT BORE ADAPTER

(71) Applicant: THE ADEPT GROUP, INC., Los Angeles, CA (US)

(72) Inventors: Ernest H. Reed, Chino, CA (US); Alex Spataru, Los Angeles, CA (US); Bryan A. Kitchener, Saugus, CA (US)

(73) Assignee: The Adept Group, Inc., Los Angeles, CA (US)

( * ) Notice: Subject to any disclaimer, the term of this patent is extended or adjusted under 35 U.S.C. 154(b) by 0 days.

(21) Appl. No.: 14/480,423

(22) Filed: Sep. 8, 2014

Related U.S. Application Data

(60) Provisional application No. 61/874,795, filed on Sep. 6, 2013.

(51) Int. Cl.
*F16K 1/04* (2006.01)
*F16K 1/42* (2006.01)

(52) U.S. Cl.
CPC . *F16K 1/04* (2013.01); *F16K 1/42* (2013.01); *Y10T 137/8634* (2015.04)

(58) Field of Classification Search
CPC ... F16K 1/04; F16K 1/42; Y10T 137/86372; Y10T 137/86332; Y10T 137/8634
USPC ........................................................ 251/265
See application file for complete search history.

(56) References Cited

U.S. PATENT DOCUMENTS

| | | | | |
|---|---|---|---|---|
| 1,495,581 A * | 5/1924 | Ehrentranut | ............ | G01F 23/30 374/142 |
| 1,642,412 A * | 9/1927 | Farnsworth | ............. | F16K 1/302 251/265 |
| 3,981,324 A * | 9/1976 | Waring | ................... | F16K 1/305 137/556.6 |
| 6,102,367 A * | 8/2000 | Schmitz | .................. | F16K 1/303 137/68.11 |
| 7,588,231 B2 * | 9/2009 | McTier | ............... | G01F 23/0007 137/588 |
| 7,721,764 B2 * | 5/2010 | Louwagie | ................. | F16K 1/04 137/597 |

* cited by examiner

*Primary Examiner* — Kevin Lee
(74) *Attorney, Agent, or Firm* — Samuel M. Freund; Cochran Freund & Young LLC

(57) ABSTRACT

An apparatus for reducing the outlet bore restriction of the inlet tube of existing outage gauges from a diameter of 0.055 in. to a chosen diameter, thereby reducing the quantity of LP Liquid and/or Gas, or other liquid or gaseous fluid, escaping from an LP Gas tank during filling thereof, is described. By retrofitting the original valve stem of an outage gauge with an adapter having a smaller inlet bore and a smaller stem, which screws into the adapter, the restriction of the outlet bore is achieved without requiring the emptying the LP Gas tank upon which the outage gauge is mounted.

4 Claims, 2 Drawing Sheets

VENT BORE ADAPTER

CROSS-REFERENCE TO RELATED APPLICATIONS

The present application claims the benefit of U.S. Provisional Patent Application No. 61/874,795 for "Vent Bore Adapter" which was filed on Sep. 6, 2013, the entire content of which is hereby specifically incorporated by reference herein for all that it discloses and teaches.

FIELD OF THE INVENTION

The present invention relates generally to outage gauges for Liquid Petroleum Gas (LP Gas) tanks and, more particularly, to an adapter for reducing the vent bore size of an outage gauge for LP Gas tanks.

BACKGROUND OF THE INVENTION

Outage gauges (also called "fixed liquid level gauges," or "spitter valves") are required to be used to determine when an LP Gas tank is legally full, that is, when the liquid reaches 80% full of the maximum capacity volume. When LP Gas tanks are filled, LP Gas is released through outage gauges as a gas, as a liquid, and as a mixture of the two phases. A signal to terminate the LP Gas tank filling process occurs when liquid appears through the outage gauge. The outage gauge includes a small-bore valve located on the outside of the tank, typically on the top surface of the tank that is attached to a hollow tube which passes through the tank wall to the 80% liquid full level thereof at 40° F. It also includes a flow limiting restriction with a diameter of 0.055 in. that is typically located inside the tube.

In use, the small-bore valve is opened before the fueling process begins, and is closed at the termination of the process. A refueling operator must wear gloves to avoid burns when closing the valve. A small amount of liquid may be released when the valve is first opened, followed principally by vapor, and then mostly by liquid, when the tank has reached 80% full of maximum capacity, as the liquid enters the bottom of the outage gauge tube.

Recently, a change in air quality management rules has required that outage gauges reduce flow limiting restrictions, from the current diameter of 0.055 in. to a diameter of 0.025 in., to limit the quantity of escaping emissions (South Coast Air Quality Management District Rule #1177). To comply with this ruling, LP Gas distribution companies are required to change the outage gauges on all stationary tanks, a requirement that may necessitate the emptying of all tanks in advance of the installation of the new outage gauges. Such refitting would cost significant time and money.

SUMMARY OF THE INVENTION

Embodiments of the present invention overcome the disadvantages and limitations of the prior art by providing an adapter for reducing the vent bore size of an outage gauge for an LP Gas tank.

Another object of embodiments of the present invention is to provide an adapter for reducing the vent bore size of an outage gauge for an LP Gas tank, which may be retrofitted on existing outage gauges.

Still another object of embodiments of the present invention is to provide an adapter for selecting the vent bore size of an outage gauge for an LP Gas tank.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, the device for reducing liquid and/or gas venting from an outage gauge having a housing with an inlet bore having an inlet orifice for receiving a liquid and/or gaseous fluid at one end, and a second end opening into a closed end of a threaded internal bore of the housing, the closed end having an internal surface; and an exit orifice in the side of the internal bore opening into an exit bore of the housing for permitting liquid and/or gaseous fluid to exit the housing, hereof, includes: a hollow cylindrical adapter having a threaded internal bore having an open end; an opposing closed end having an inlet bore with a chosen diameter therethrough with an inlet orifice at one end of the inlet bore opening onto a flat interior surface of the closed end and facing the open end of the threaded internal bore, the second end of the inlet bore being in fluid communication with the second end of the inlet bore of the housing, the closed end further having an exterior surface; and a threaded external portion adapted to be screwed into the threaded internal bore of the housing; a threaded stem having stem handle attached to or integrally formed with the stem at one end, adapted to be screwed into the threaded internal bore of the cylindrical adapter; a first sealing member disposed at a second end of the stem effective for providing a seal with the inlet orifice of the inlet bore of the adapter when the first sealing member is placed in contact with the flat surface of the closed end of the adapter by rotation of the stem; a second sealing member effective for sealing the exterior surface of the closed end of the adapter with the internal surface of the closed end of the housing when the adapter is screwed into the housing, while permitting liquid and/or gaseous fluid to enter the inlet orifice when the inlet orifice is not sealed by the first sealing member; and at least one vent in said adapter opening into the internal bore of the housing, for permitting liquid and/or gaseous fluid to exit the housing through the exit orifice thereof.

Benefits and advantages of embodiments of the present invention include, but are not limited to, providing an adapter for reducing the vent bore size of an outage gauge for an LP Gas tank, which may be readily retrofitted on existing outage gauges without significant waste of LP Gas.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of a perspective side view of an outage gauge known in the art in its closed position, while FIG. 1B is a schematic representation of a perspective side view of the outage gauge shown in FIG. 1A hereof, in its open position.

FIG. 2A is a schematic representation of a perspective side view of the outage gauge shown in FIG. 1A, hereof having the threaded stem thereof replaced by the vent bore adapter of the present invention in its closed position, while

DETAILED DESCRIPTION OF THE INVENTION

The vent bore adapter of the present invention includes apparatus for reducing the outlet bore restriction of the inlet tube of existing outage gauges from the currently used diameter of 0.055 in. to a diameter of 0.025 in. or other chosen smaller diameter, thereby reducing the quantity of LP Gas escaping from an LP Gas tank during filling thereof. In accordance with the teachings of the present invention, the original valve stem of an outage gauge is replaced with an adapter having a smaller inlet bore and a smaller stem which screws into the adapter.

The present adapter permits retrofitting of existing outage gauges to conform to the new ruling without the requirement of emptying the LP Gas tanks upon which the outage gauges are mounted. Further, an outage gauge once retrofitted with an embodiment of the vent bore adapter is readily distinguishable from existing outage gauges, since it has a smaller stem and stem handle. This is particularly helpful when auditors check LP Gas tanks for rule compliance.

Figures 1A, 1B:
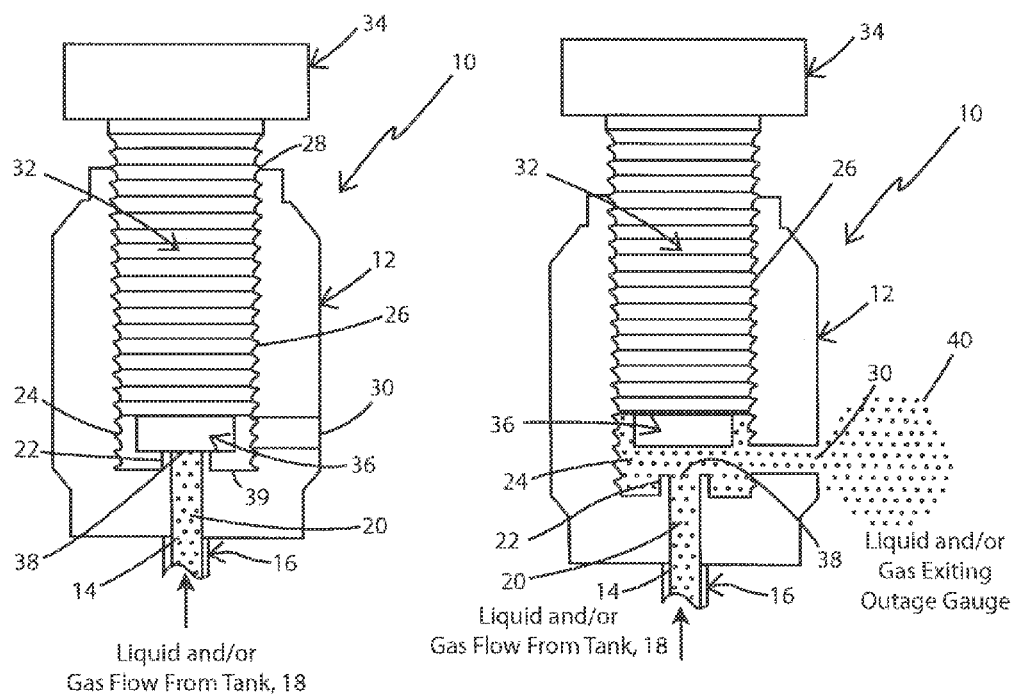

Reference will now be made in detail to the present embodiments of the invention, examples of which are illustrated in the accompanying drawings. It will be understood that the FIGURES are for the purpose of describing particular embodiments of the invention and are not intended to limit the invention thereto. Turning now to FIG. 1A, shown is a schematic representation of a perspective side view of outage gauge, 10, known in the art, in its closed position. Outage gauge 10 includes gauge housing, 12, having gauge inlet bore, 14, for receiving liquid and/or gas from the LP Gas tank onto which gauge 10 is mounted through tube, 16, in fluid communication with gauge housing 12, and which passes through the wall of tank, 18. Inlet bore, 20, opens at one end to orifice 14 and at the other end through cylindrical protrusion, 22, into internal bore, 24, of gauge housing 12, which is threaded, 26, over at least a portion of its length beginning at opening 28 of bore 24. Gas and/or liquid entering bore 24 exits outage gauge 10 through exit orifice, 30. Threaded stem, 32, having stem handle, 34, either attached to or integrally formed with stem 32 at one end, is adapted to be screwed into threaded internal bore 24 of housing 12. Flexible, deformable sealing disk, 36, disposed at the other end of stem 32, is effective closing off bore 20 at mouth or orifice, 38, of protrusion 22, by the rotation of stem 32. In the situation where protrusion 22 is not present in the outage gauge 10, sealing disk 36 may seal against internal surface, 39, of bore 24 of gauge 10.

FIG. 1B is a schematic representation of a perspective side view of outage gauge 10 shown in FIG. 1A hereof, in its open position, illustrating gas and/or liquid, 40, flowing from outlet orifice 30. In existing outage gauges, inlet bore 20 has a diameter of 0.055 in., while outlet orifice 30 has a diameter ≥0.055 in.

Figure 2A:
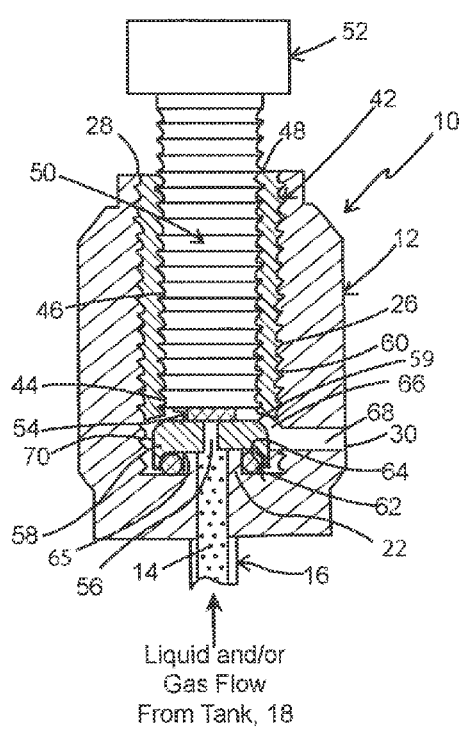

FIG. 2A is a schematic representation of a perspective side view of the outage gauge shown in FIG. 1A, hereof having threaded stem 32 thereof replaced by an embodiment of vent bore adapter, 42, of the present invention in its closed position. As in FIG. 1A, gauge housing 12 has inlet bore, 14, for receiving liquid and/or gas from the LP Gas tank, or other liquid and/or gas fluid, onto which gauge 10 is mounted through tube 16, which passes through the wall of tank, 18, and outlet orifice, 30, through which gas and/or liquid exit outage gauge 10. Hollow cylindrical vent bore adapter 42 has internal bore, 44, which is threaded, 46, along a portion of its length beginning at open end, 48, of adapter 42.

Threaded stem, 50, having stem handle, 52, either attached to or integrally formed with stem 50 at one end, is adapted to be screwed into threaded internal bore 44 of housing adapter 42. Flexible, deformable sealing disk, 54, disposed at the other end of stem 50, is effective for closing off bore, 56, formed in end wall, 58, of adapter 42, by sealing against interior surface, 59, by the rotation of stem 50. Inlet bore 56 has a diameter of 0.025 in. to meet present flow regulations. Clearly, if regulations change, this bore diameter can be adjusted to meet the new requirements.

The external portion of cylindrical adapter 42 is threaded, 60, such that it may be screwed into threaded internal bore 22 of housing 12 using, for example, a slotted portion, not shown in FIG. 2A, adapted to receive the flat blade of a screw driver.

Flexible, deformable O-ring, 62, disposed in O-ring groove, 64, formed on the exterior of end wall 58 of adapter 42 is effective for sealing adapter 42 against protrusion 22 and interior surface 39 (FIG. 1A) of outage gauge 10, when adapter 42 is screwed into gauge housing 12.

Figure 2B:
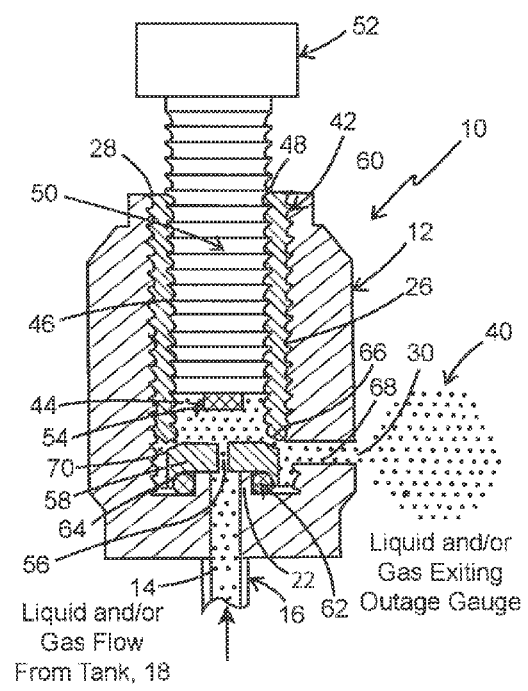
FIG. 2B is a schematic representation of a perspective side view of the outage gauge shown in FIG. 2A hereof, in its open position.

In outage gauges not having protrusion 22, a second flexible, deformable sealing member or sealing disk may be attached to external surface, 65, of adapter 42 to seal against interior surface 39 (FIG. 1A) of outage gauge 10, not shown in FIGS. 2A and 2B. The second sealing member would have a bore therethrough to permit liquid and/or gaseous fluid to flow between gauge inlet bore 14 and adapter inlet bore 56.

Vent, 66, is shown opening into bore, 68, of gauge housing 12, which opens into exit orifice 30. This alignment is unnecessary since the exterior diameter of the region above end wall 58 of adapter 42 is made smaller than the diameter of the external threads of the adapter, thereby permitting gas and/or liquid exiting bore 56 to readily flow around the outside of adapter 42 and into bore 68. Similarly, vent, 70, is shown as being bored through the opposite side of adapter 42. Again, because of the reduction in the external diameter of the adapter in the region of end wall 58, any number of vents having any chosen arrangement may be selected.

FIG. 2B is a schematic representation of a perspective side view of the outage gauge shown in FIG. 2A hereof, in its open position.

Having generally described the present invention, the following EXAMPLE is set forth to provide additional details.

EXAMPLE

A leak detection fluid was sprayed onto an outage gauge mounted on an LP Gas tank retrofitted with the adapter described hereinabove in its closed condition, and visual observation for about 10 min. showed no bubbles, which indicates the absence of a leak. The present adapter was installed in outage gauges on LP Gas truck tanks and standalone LP Gas tanks with similar results.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A device adapted for insertion into an outage gauge having a housing with an inlet bore having an inlet orifice for receiving a liquid and/or gaseous fluid at one end, and a second end opening into an end wall of a threaded internal bore of said housing, the end wall having an internal surface; and an exit orifice in the side of the internal bore opening into an exit bore of said housing for permitting liquid and/or gaseous fluid to exit said housing, said device, comprising:
   a hollow cylindrical adapter having a threaded internal bore having an open end; an opposing end wall having an inlet bore with a chosen diameter therethrough with an inlet orifice at one end of the inlet bore opening onto a flat interior surface of the end wall and facing the open end of the threaded internal bore, a second end of the inlet bore being in fluid communication with the second end of the inlet bore of said housing, the end wall further having an exterior surface; and a threaded external portion adapted to be screwed into the threaded internal bore of said housing;
   a threaded stem having a stem handle attached to or integrally formed with said stem at one end, adapted to be screwed into the threaded internal bore of said cylindrical adapter;
   a first sealing member disposed at a second end of said stem effective for providing a seal with the inlet orifice of the inlet bore of said adapter when said first sealing member is placed in contact with the flat surface of the end wall of said adapter by rotation of said stem;
   a second sealing member effective for sealing the exterior surface of the end wall of said adapter with the internal surface of the end wall of said housing when said adapter is screwed into said housing, while permitting liquid and/or gaseous fluid to enter the inlet orifice when the inlet orifice is not sealed by said first sealing member; and
   at least one vent in said adapter opening into the internal bore of said housing, for permitting liquid and/or gaseous fluid to exit said housing through the exit orifice thereof.

2. The device of claim 1, wherein the second end of the inlet bore of said housing forms a hollow cylindrical protrusion on the internal surface of the end wall of the threaded internal bore of said housing having an outer surface and an opening into the threaded internal bore, and wherein said second sealing member comprises an O-ring disposed in an O-ring groove formed in the exterior surface of the end wall of said adapter effective for sealing said adapter against the outer surface of the protrusion and the internal surface of the end wall of the threaded internal bore when said adapter is screwed into said housing.

3. The device of claim 1, wherein said first sealing member comprises a flexible, deformable disk.

4. The device of claim 1, wherein the chosen diameter of the inlet bore of said adapter limits the flow of liquid and/or gaseous fluid through said outage gauge.

* * * * *